UNITED STATES PATENT OFFICE.

LOUIS J. GRAUE, OF BROOKLYN, NEW YORK.

PICKLING MATERIAL.

1,331,866.

Specification of Letters Patent. Patented Feb. 24, 1920.

No Drawing. Application filed May 19, 1915. Serial No. 29,099.

*To all whom it may concern:*

Be it known that I, LOUIS J. GRAUE, a citizen of the United States, residing at the borough of Brooklyn, in the county of Kings and State of New York, have invented certain new and useful Improvements in Pickling Material, of which the following is a specification.

My invention relates to improvements in the use of materials for removing foreign matter such as rust, scale or dirt from the surface of metal, and more particularly is adapted for use in treating metals prior to the galvanizing or plating of the same.

It has been the custom generally prior to the galvanizing or plating of metal surfaces to submerge the metal to be treated in an acid bath for the purpose of removing the foreign matter from the surface thereof, but in doing this the surface of the metal itself is attacked by the acid and unless the operation is conducted with great care and skill the surface of the metal is seriously affected and disfigured by the acid. Instead of acid other ingredients less active have also been employed but not with satisfactory results and have never gone into general use.

According to my invention in its preferred application I prefer to mix a by-product obtained in the manufacture of acid such as salt cake as a by-product obtained in the manufacture of sulfuric acid, or better still, niter cake, a by-product obtained in the manufacture of nitric acid. The cake is preferably broken into granulated or powdered form and mixed with organic material also preferably in powdered form and preferably the powdered leaves of the sumac tree which is grown in Sicily.

When using ground niter cake I prefer to employ about one hundred pounds of the same to about three pounds, five ounces of ground Sicilian sumac leaves which is usually imported in bags. These powders are mixed dry by any suitable mechanical means and I then form a solution by introducing about one gallon of water to every pound of the mixed powder. This makes a strong solution which of course can be weakened by using less powder in proportion to the amount of water used, or the solution may be strengthened by adding more powder or less water. By heating the solution the same will be also strengthened. Instead of using the sumac leaves the bark or root may of course be used but the proportions should be varied according to the work for which the solution is intended, and in fact other organic matter may be employed with the ground cake but the proportions will vary accordingly and for general purposes I have found that niter cake and the ground sumac leaves give about the best results when considering such matters as the cost of materials.

Of course it will be understood that a wide range of selection may be had in the use of by-products and in the use of organic materials and the desirable proportions for mixing the same. These conditions vary largely according to the class of work for which it is intended. In other words, a much stronger solution would be required for removing old scale and heavy rust upon iron than mere grease or dirt upon brass and the correct proportions and strength of solutions will have to be determined according to the uses for which the invention is to be applied.

For some purposes it may not be found necessary to make a solution from the acid cake and organic matter as it will be found that by tumbling or rubbing the same into the surface of the metal to be treated that the same may be readily removed thereby. 1 part of rock salt or ordinary table salt to about 3 parts of the above mixture of by-product and organic material will also be found very desirable.

In fact, various modifications may be made without departing from the spirit of the invention as claimed.

I claim:

1. A pickling solution of niter cake and sumac comprising about one hundred pounds of niter cake to about three pounds, five ounces of sumac leaves in about a gallon of water.

2. A solution containing a mixture of acid cake and organic material for removing foreign matter from the surface of metal, said solution comprising about one hundred pounds of niter cake to about three pounds, five ounces of ground sumac leaves and about one gallon of water to each pound of the said cake and leaves.

In testimony whereof I hereunto affix my signature in the presence of two witnesses.

LOUIS J. GRAUE.

Witnesses:
 LOUISE ENDERLE,
 THOMAS A. HILL.